Feb. 23, 1926. 1,574,432
J. L. LIVZEY
SHOCK ABSORBER
Filed Feb. 26, 1924

J. L. Livzey, Inventor

By C. A. Snow & Co.
Attorney

Patented Feb. 23, 1926.

1,574,432

UNITED STATES PATENT OFFICE.

JOHN LESTER LIVZEY, OF MIDDLETOWN, OHIO.

SHOCK ABSORBER.

Application filed February 26, 1924. Serial No. 695,257.

*To all whom it may concern:*

Be it known that I, JOHN L. LIVZEY, a citizen of the United States, residing at Middletown, in the county of Butler and State of Ohio, have invented a new and useful Shock Absorber, of which the following is a specification.

This invention relates to a shock absorber designed for use in connection with motor vehicles, one of the objects of the invention being to provide a simple form of device which can be applied readily to vehicles and will act as a supplemental means for absorbing the shock to which the vehicle is subjected, the said shock absorber being coupled to and actuated by the movement of the body relative to the springs used for supporting the same.

Another object is to provide a device of this character which is simple and compact in construction and will not readily get out of order.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1:
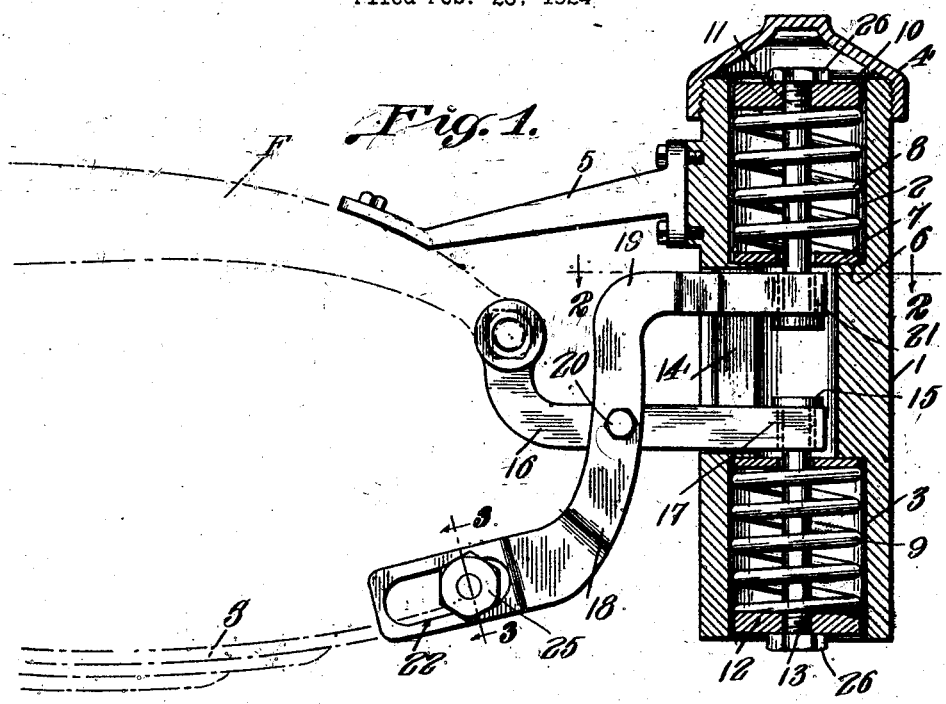
Figure 1 is a view partly in elevation and partly in section showing the device attached to a portion of a vehicle, said portions being shown by broken lines.
Figure 2:
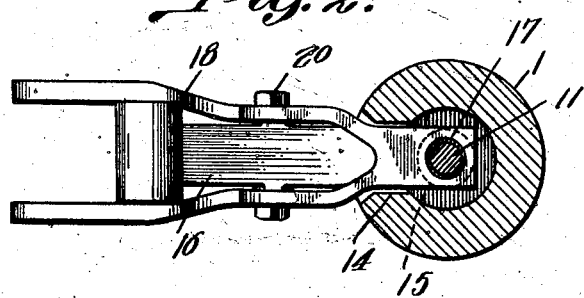
Fig. 2 is a section on line 2—2, Fig. 1.
Figure 3:
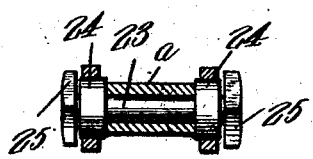
Fig. 3 is a section on line 3—3, Fig. 1.

Referring to the figures by characters of reference 1 designates a housing, preferably cylindrical, the same being provided with counter bores 2 and 3 in the upper and lower ends thereof, the upper counter bore being preferably closed normally by a screw cap 4. A bracket 5 is attached to the housing 1 and is adapted to be secured to a portion of the frame F of the vehicle.

The inner end of each counter bore 2 and 3 provides a seat 6 and these seats are engaged by disks 7 one of which constitutes a bearing for a coiled spring 8 while the other disk constitutes a bearing for a coiled spring 9. Spring 8 bears upwardly against a head 10 connected to one end of a rod 11 movable loosely within the disk 7. Spring 9 bears against a head 12 secured to a rod 13 movable loosely in the other disk 7. That portion of the housing between the counter bores is slotted as shown at 14 and the inner ends of the rods 11 and 13 are located back of the slot and are provided with heads 15.

Pivotally connected to the frame F at the point where the spring S is usually connected, is a lever 16 one end of which projects loosely through the slot 14 and is provided with an opening 17 into which rod 13 extends loosely, separation of the lever from the rod being prevented by the head 15 on said rod. The lever 16 extends through the downwardly extended forked portion 18 of a lever 19, the two levers being pivotally connected at 20. The upper end of lever 19 is extended loosely through the slot 14 and has an opening 21 into which the rod 11 projects loosely, the head of said rod preventing separation of the lever from the rod.

The lower end portion of lever 18 has its sides slotted as shown at 22. The eye $a$ at the end of the spring S is located between the slotted portions of the lever 19 and a bolt 23 extends through this eye and through the slot 20. Rollers 24 are mounted on the bolt between eye $a$ and the ends of the bolt and are adapted to work within the slots 22. Heads 25 on the ends of the bolts serve to prevent the rollers from becoming displaced laterally relative to the slots and also lap the sides of the lever to hold the lever against spreading.

As shown in Fig. 1 the shock absorber is adapted to be used as a connection between the frame F and the spring S. When the frame moves downwardly relative to the spring the two levers 16 and 19 swing relative to each other about the pivot 20 so that those ends thereof within the housing 1 will be moved toward each other. This will result in compression of the springs 8 and 9 and consequent absorption of shock. During this relative movement of the frame and spring the rollers 24 will travel within the slots 22 as will be apparent. Furthermore the levers will be guided by the walls of the slot 14 so as to be held in proper positions relative to each other and thus prevent distortion of the pivot 20.

It will be noted that this structure does not interfere with the function of the spring S but merely serves as a supplemental means for absorbing shocks that would not be taken care of by the spring S.

Obviously shock absorbers such as described can be placed between the springs and the frame at any point desired. The compression of the springs 8 and 9 can be regulated by means of nuts 26 engaging the rods 11 and 13. By means of these nuts the disks or heads 10 and 12 can be shifted against the spring to hold them under increased compression.

What is claimed is:—

A shock absorber including a housing having a longitudinal bore extending therethrough, the ends of the bore being counter bored to provide interior shoulders, there being a longitudinal guide slot in the housing between the counter bores and opening into the central portion of the bore, disks normally resting upon the shoulders at the inner ends of the counter bores, rods slidably mounted within the respective disks, head connected to the respective rods and slidable within the respective counter bores, a spring within each counter bore bearing at one end against the disk therein and at its other end against the head therein, crossed pivotally connected levers projecting at one end through the slot and into the bore, said levers engaging and adapted to actuate the respective rods, a bracket for fixedly attaching the housing to a vehicle, and means for movably connecting the outer ends of the levers to a vehicle frame and spring respectively.

In testimony that I claim the foregoing as my own, I have hereto affixed my signature.

JOHN LESTER LIVZEY.